US008001275B2

United States Patent
Grin et al.

(10) Patent No.: US 8,001,275 B2
(45) Date of Patent: *Aug. 16, 2011

(54) METHODS OF PROVIDING PUBLISHED CONTENT

(75) Inventors: Russell Grin, Mahomet, IL (US); Crosby Haffner, Glendale, CA (US)

(73) Assignee: Tactara, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/635,463

(22) Filed: Dec. 10, 2009

(65) Prior Publication Data

US 2010/0088106 A1   Apr. 8, 2010

Related U.S. Application Data

(63) Continuation of application No. 12/503,335, filed on Jul. 15, 2009, now Pat. No. 7,653,751, which is a continuation of application No. 12/175,333, filed on Jul. 17, 2008, now Pat. No. 7,594,035.

(60) Provisional application No. 61/030,853, filed on Feb. 22, 2008.

(51) Int. Cl.
*G06F 15/16* (2006.01)
*G06F 12/00* (2006.01)

(52) U.S. Cl. .......................... 709/246; 709/217

(58) Field of Classification Search .................. 709/246, 709/217–218, 245, 247, 250
See application file for complete search history.

(56) References Cited

U.S. PATENT DOCUMENTS

| | | | |
|---|---|---|---|
| 6,954,783 B1 | 10/2005 | Bodwell et al. | |
| 7,103,645 B2 | 9/2006 | Leighton et al. | |
| 7,594,035 B2 * | 9/2009 | Grin et al. ...................... | 709/246 |
| 7,653,751 B2 * | 1/2010 | Grin et al. ...................... | 709/246 |
| 2002/0035617 A1 * | 3/2002 | Lynch et al. .................. | 709/219 |
| 2003/0120543 A1 | 6/2003 | Carey | |
| 2006/0026067 A1 | 2/2006 | Nicholas et al. | |
| 2006/0173985 A1 | 8/2006 | Moore | |
| 2006/0265489 A1 | 11/2006 | Moore | |
| 2007/0043766 A1 | 2/2007 | Nicholas et al. | |
| 2009/0271475 A1 * | 10/2009 | Grin et al. ...................... | 709/202 |

OTHER PUBLICATIONS

Hammond, Tony et al., The Role of RSS in Science Publishing, D-Lib Magazine, Dec. 2004, vol. 10, No. 12, Tony Hammond, Timo Hanny, and Ben Lund.

* cited by examiner

*Primary Examiner* — Zarni Maung
(74) *Attorney, Agent, or Firm* — Fish & Associates, PC

(57) ABSTRACT

Methods of providing published content are presented. Content providers, including advertisers, can have their network addresses become black listed through no fault of their own. Content providers can utilize one or more intermediary providers each having their own distinct network address, possibly a registered domain name. An advertiser or other content provider can engage members of a distribution channel to disseminate promotional information to consumers where the promotional information comprises a network address of the intermediary provider. Upon a request directed toward the network address, the intermediary transforms published content obtained from the primary provider to make the content appear as though it originated from the intermediary provider. Should a black listing event occur, only the intermediary provider would be affected. An updated or new intermediary provider having a new, distinct network address can be instantiated to replace the black listed provider.

20 Claims, 8 Drawing Sheets

METHODS OF PROVIDING PUBLISHED CONTENT

This application is a continuation of U.S. application having Ser. No. 12/503,335, filed Jul. 15, 2009 which is a continuation of U.S. application having Ser. No. 12/175,333, filed Jul. 17, 2008, which claims priority to U.S. provisional application having Ser. No. 61/030,853, filed on Feb. 22, 2008, each of which are incorporated herein by reference in their entirety.

FIELD OF THE INVENTION

The field of the invention is content publishing technologies.

BACKGROUND

Advertisers have a desire to increase exposure of their goods or services. On the Internet, advertisers seek publishers to spread the word about the advertiser's goods or services. Commonly, publishers generate exposure for an advertiser's web site or promotional content by placing ads on web pages, purchasing search results advertising for specific key words, sending email advertisements, or through other methods of creating exposure to the advertiser's goods and services. The various types of advertisements also include uniform resource locators (URLs) comprising a network address where published content about goods or services can be obtained.

Publishers work with one or more other members of a distribution channel to spread the word about an advertiser's promotional content. Other distribution members include firms that have customers for whom such advertising is appropriate (e.g., a list of email addresses), brokers which connect advertisers with publishers, and other parties that aid in distributing advertisements. Each party often requires some form of accounting to indicate if their services were used when a consumer makes a request for published content. Accounting is generally achieved through the common practice of client redirection. Although existing publication models achieve their goal of distributing advertisements, these models have various weaknesses.

One issue with known publication models is that advertisers can be penalized for the undesirable business practices of their publishers and other distribution channel members. Publishers are responsible for exposing an advertiser's promotional content to consumers, and generally advertisers have no control of or visibility to the methods employed by its publishers. For example, if a publisher distributes email advertisements to a list of individuals who have no interest in the advertiser's goods or services, these individuals might report such emails as spam. In severe cases, these reports can lead to the black listing of an advertiser's web site. This has catastrophic consequences for an advertiser as well as every other publisher promoting that advertiser's content, as black listing prevents consumers from reaching the advertised content. Complicating matters further, advertisers are typically unable to identify the publisher responsible for such black listing, making publisher accountability difficult or impossible.

Other known issues with existing publication models include delays in content delivery experienced by consumers and caused by client redirection. Excessive perceived delays can result in a consumer losing interest in the promotion even before obtaining content.

Ideally content providers, including advertisers, should be able to publish content while being insulated from black listing events or other negative reputation due to circumstances outside their control. Furthermore, published content should be provided to a client without requiring the client to be redirected.

Others have suggested using an intermediary content provider that can relay information from a primary provider to a remote user for various purposes. Examples include U.S. Pat. No. 6,953,783 to Bodwell et al., U.S. Pat. No. 7,103,645 to Leighton et al., and U.S. patent publication 2003/0120543 to Carey. Unfortunately, the approaches described in these and other references fail to fully protect a publisher from a black listing event. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

What has yet to be appreciated is published content can be provided through an intermediary provider that appears as an originating source of the content while also reducing requirements for client redirection. Publishers provide access to content via a network address associated with the intermediary provider. Consumers or other clients can request the content directly from the intermediary provider. The intermediary provider can aggregate content from a primary provider, an advertiser for example, by obtaining the content at the primary provider's network address. The intermediary provider can then present the published content to the client. Should a black listing event occur, only the intermediary provider would be black listed as opposed to the primary provider. Furthermore, all redirections can be accomplished behind the intermediary provider.

Thus, there is still a need for methods of providing published content to a client.

SUMMARY OF THE INVENTION

The present invention provides apparatus, systems and methods in which published content can be provided to a client. A client can direct a request for published content to the network address of an intermediary content provider. The published content is aggregated from at least one primary content provider by obtaining the content from each of the primary content providers at a network address distinct from the intermediary content provider's address. As the published content is obtained, it is transformed into a transformed content according to a transformation policy where the transformed content appears to originate from the intermediary provider. In response to the client's request, the intermediary provider forwards the transformed content to the client.

As used herein "content", including "transformed content", comprises data presented to requesting client, including functionality supported by the data. Contemplated content data can include audio, images, video, data streams (e.g., on-line radios, broadcasts, web cams, etc. . . . ), data feeds (e.g., ATOM, RSS, blogs, etc. . . . ), text, data files, scripts, APIs, or other types of data, functionality, or services that can be provided to a client. "Published content" means content that is offered from a first host to a second host. For example, a client can access published content from a server. It is also contemplated that publishing content can be bidirectional where the client can also provide its own published content to the server.

In one aspect of the inventive subject matter, one or more intermediary providers, each with their own distinct network address, are instantiated on a virtual content hosting service (VCHS). The hosted intermediary providers service client requests for published content. As necessary, an intermediary provider's address (e.g., a domain name) can also be registered with an address registration service (e.g., a domain name registrar).

In other aspects of the inventive subject matter, transformation policies associated with the various intermediary providers can be managed. Contemplated management activities include monitoring the operation of policies, monitoring modifications to published content, updating or configuring policies, logging events, or other management related functions.

Various objects, features, aspects and advantages of the inventive subject matter will become more apparent from the following detailed description of preferred embodiments, along with the accompanying drawings in which like numerals represent like components.

DETAILED DESCRIPTION

The following description discusses the inventive subject matter within the light of an example advertising system where an advertiser publishes advertising content. In the presented examples, an advertiser engages one or more members of a distribution channel to disseminate promotional information to consumers. Consumers access the advertiser's published content through an intermediary content provider which insulates the advertiser from the reputation of its publishers, and segregates the respective reputations of each intermediary content provider. In a preferred embodiment where each publisher has dedicated or exclusive use of an intermediary content provider, this reputation segregation and insulation reduces the risk of any intermediary provider becoming black listed, and minimizes or eliminates the effects of a black listing event on the advertiser and other publishers which are not responsible for such black listing.

Figure 1:
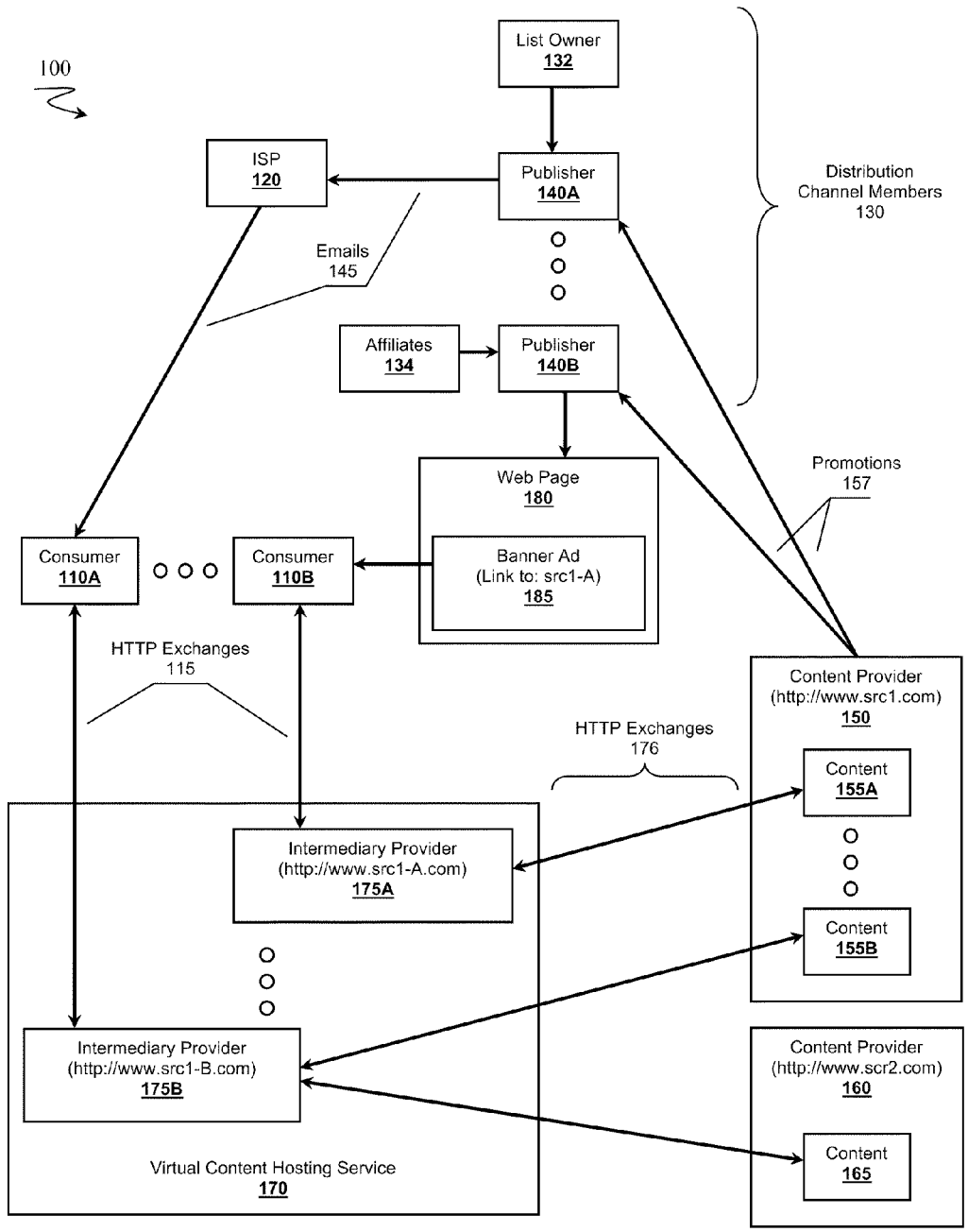
FIG. 1 is a schematic of an example system that provides published content through an intermediary content provider.

In FIG. 1, system 100 represents an environment where an advertiser operating as primary content provider 150 provides published content 155A through 155B to consumers 110A through 110B via one or more intermediary content providers 175A through 175B.

Primary content provider 150 preferably includes an advertiser that wishes to promote goods or services by providing published content to consumers. In a preferred embodiment, primary provider 150 comprises a network address, http://www.src1.com, that can be used to obtain one or more pieces of content 155A through 155B.

In some embodiments, an additional primary provider 160 can also provide content 165 to consumers via its network address, http://www.src2.com. Additional provider 160 could also be owned by the same entity as provider 150. Alternatively, additional provider 160 could be owned by a different entity. Consider, for example, where provider 150 publishes content 155A and also publishes advertisements from Google®. In the example, Google® represents additional provider 160 and the advertisements from Google represents content 165. The utility of aggregating content from one or more providers will become more apparent in the discussion below.

Network addresses preferably include identifiers used to locate objects, either real or virtual, over a network. In a preferred embodiment, a network address comprises a Uniform Resource Locator (URL), preferably including a domain name that is resolvable to an IP address via the Domain Name System (DNS). Other contemplated network addresses include IPv4 addresses, IPv6 address, transport layer port assignments, hostnames, telephone numbers, instant messaging addresses, or other addressing schemes.

Most preferred internet network addresses comprise registered domain names where the registered name is used in conjunction with a top level domain (TLD; e.g., .com, .edu, .net, .org, etc. . . . ) to identify a provider and where published content can be obtained. An example of a preferred network includes prefix.domain-name.com where "domain-name" represents the registered domain name. "Prefix" can be of take any desirable form (e.g., www) or simply not be present as is well known in the art. Most preferred URLs identifying content incorporate a registered domain name.

Primary content provider 150 can have one or more advertising campaigns that include one or more of promotions 157. Promotions 157 include initial information regarding the advertiser's goods or services. Preferred promotions 157 provide or redirect to a network address of an intermediary provider 175A or 175B where published content can be obtained as opposed to the network address of primary provider 150.

When provider 150 wishes to begin promoting their goods or services, provider 150 can engage one or more members of a distribution channel 130 to disseminate promotions 157. Distribution channel members 130 can include publishers 140A to 140B, ISPs 120, email list owners 132, affiliates 134, brokers, or others that can participate with creating exposure for promotions 157. In some embodiments, provider 150 might only engage publisher 140A while publisher 140A engages other distribution channel members 130 without the knowledge of provider 150.

A publisher can pursue a plurality of different methods for disseminating promotions 157. In one of the examples shown, publisher 140A obtains a list of email addresses from list owner 132. Publisher 140A or another of members 130 sends emails 145 to a plurality of consumers 110A through 110B. The emails preferably include one or more URLs comprising network addresses of intermediary providers 175A or 175B where consumer 110A can obtain published content. In another of the examples shown, publisher 140B works with affiliate 134 to place ad 185 within web page 180. Web page 180 can be hosted at any location including on a site owned by affiliate 134. Preferably, ad 185 includes a URL link directed toward an intermediary provider. Ad 185 can take any desirable form including banner ad, text ads, video, images, audio, or other types of promotions, known or yet to be invented. Although two examples of publishing promotions 157 are presented, one skilled in the art will appreciate that other disseminating methods can also be employed while still falling within the scope of the inventive subject matter. Other contemplated methods can include purchasing key words on search engines, sending instant messages, sending text messages on cell phones, or other means for sending a promotion to a consumer.

It is contemplated that a distribution channel member 130 could refuse to propagate promotions 157. For example, ISP 120 might receive a black listing notice from a third party regarding content originating from primary content provider 150. ISP 120 might also receive complaints from consumer 110A regarding email 145 due to poor practices employed by list owner 132. ISP 120 could then refuse to forward emails 145 having similar attributes as those causing the black listing or the complaint. ISP 120 can analyze attributes associated with emails 145 to determine the originating source. An attribute can include the network address of intermediary provider 175A where the published content can be obtained. When ISP 120 detects additional promotional materials referring to the network address, it can discard emails 145. It is also contemplated that other entities in addition to ISP 120 can black list promotional information. For example, a site hosting web page 180 could refuse to place ad 185, cell phone carriers could refuse to forward text message, or email filter applications could filter emails. Regardless of which entity refuses to participate in the distribution of promotions 157, provider 150 could suffer from black listing due to poor practices from entities outside their control.

Having one or more intermediary providers 175A through 175B insulates provider 150 from a black listing event. In a preferred embodiment, promotions 157 comprise network addresses that direct consumers 110A or 110B to the intermediary providers 175A or 175B as opposed to the content provider 150. For example, consumer 110A would access content 155A via network address http://www.src1-A.com as opposed network address http://www.src1.com. Should ISP 120 decide to black list the promotional materials, the ISP would identify the source material originating from intermediary provider 175A. Intermediary provider 175A would be black listed as opposed to provider 150.

In a preferred embodiment, intermediary provider 175A is hosted on a virtual content hosting service (VCHS) 170. VCHS 170 provides sufficient hardware or software to support execution of instructions representing an intermediary provider application. One should note that it is specifically contemplated a VCHS is programmed to replace a black listed intermediary provider with a new intermediary provider having a new, distinct network address (e.g., a domain name). Preferably the VCHS automatically replaces the black listed intermediary provider.

Consumer 110A preferably accesses published content via intermediary providers 175A or 175B using HTTP exchanges 115 as is well known in the art, possibly using a web browser application. Additionally, intermediary providers 175A or 175B obtain published content 155A, 155B, or 165 from one or more of content providers 150 or 160, also preferably using HTTP exchanges 176. One skilled in the art will recognize the utility of employing HTTP to exchange published content. One should note that other network protocols can also be used to obtain published content including FTP, SMTP, peer-to-peer protocols, or other networking protocols.

Published content preferably includes Internet based data prepared for presentation to a client (e.g., a consumer). Contemplated published content includes audio, images, video, data streams (e.g., on-line radios, web cams, etc. . . . ), data feeds (e.g., ATOM, RSS, etc. . . . ), text, data files, scripts, APIs, executable files, functionality, or other types of data. Preferred published content comprises information relating to goods or services.

Although the present example illustrates intermediary provider 175A as obtaining content 155A directly from provider 150, one should appreciate that a plurality of intermediary providers can be chained together. For example, intermediary provider 175A could obtain content from intermediary provider 175B which in turn obtains content from providers 150 or 160.

Figure 2:
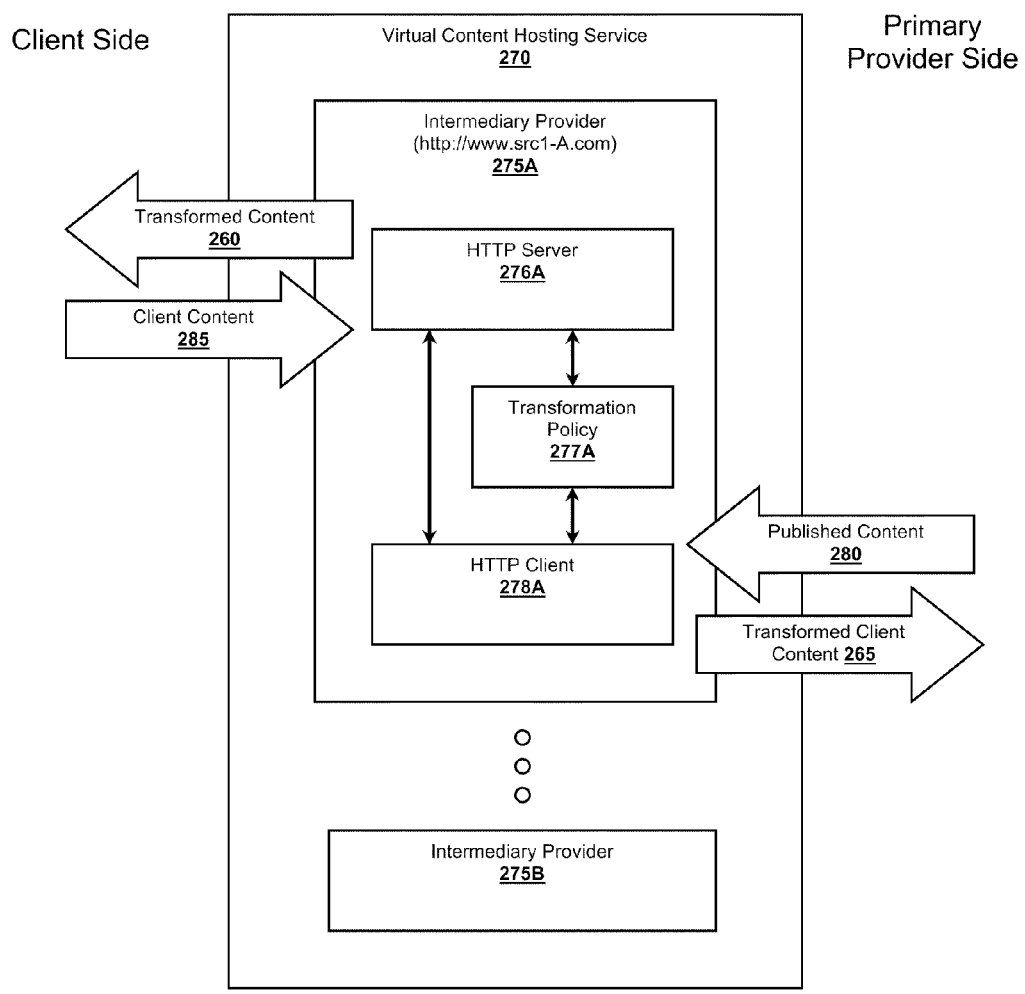
FIG. 2 is a schematic of a virtual content hosting service hosting an intermediary content provider.

In FIG. 2, VCHS 270 comprise one or more intermediary providers 275A through 275B. A preferred intermediary provider comprises an HTTP server 276A for responding to client requests directed to the network address of the intermediary provider and comprises an HTTP client 278A for obtaining published content 280 from a primary provider. Each intermediary provider preferably has its own distinct network address that is different from the primary provider's network address.

It is specifically contemplated that intermediary providers 275A through 275B can be bi-direction transformation agents. For example, a client can also submit client published content 285 to HTTP server 276A, which will then be transformed into transformed client content 265 pursuant to transformation policy 277A, and delivered by HTTP client 278A to the primary provider.

Although intermediary provider 275A can be a standalone computer, preferably intermediary provider 275A comprises one or more software modules operating on a computing system represented by VHCS 270. In some embodiments, each of intermediary providers 275A through 275B can be an instance of an operating system supporting provider functionality. For example, a single computer can run more than one instance of Linux, possibly through VMWare®, where each instance of Linux includes software representing an intermediary provider having its own network address, preferably a registered domain name. An intermediary provider can be considered a virtual server, or more aptly named a virtual content server.

Intermediary provider 275A preferably comprises an HTTP server 276A to respond to a client's request for published content. An example of an HTTP server includes Apache™ as commonly available at http://apache.org/. Although an HTTP server is preferred, any suitable server responsive to requests for published content can also be used.

Intermediary provider 275A also preferably comprises an HTTP client 278A capable of generating requests for published content 280. HTTP client 278A generates one or more requests directed toward a content that can be obtained from a primary content provider at a network address associated with the primary provider.

In a preferred embodiment, provider 275A is programmed or otherwise configured to obtain published content 280 from a specified network address associated with a primary content provider. For example, when HTTP server 276A receives a request for content at http://www.src1-A.com/, intermediary provider 275A obtains published content 280 at the specified network address, http://www.src1.com/ for example.

Intermediary provider 275A also preferably comprises transformation policy 277A. Policy 277A includes one or more rules governing inspection or modification of published content 280, or even client content 285, as it is obtained. Transformation policy 277A converts published content 280 into transformed content 260 that is presentable to a client. Policy 277A is contemplated to operate on actual content data or other data relating to the content data referred to as "metadata". A content transformation policy can include the addition of data, removal of data, modification of data, or non-transformation of data. A preferred policy 277A inspects content 280 for references of a network address of the primary content provider and then modifies content 280 into transformed content 260 in a manner where transformed content appears to originate from intermediary provider 275A via its network address. Contemplated changes include modification of links, paths, scripts, file names, cookies, directory names, or other items where a network address or transformed content could be referenced.

Untransformed content can also be provided to the client. In some embodiments, only a portion of published content 280 might require transformation while the remaining portions of published content 280 are passed on to the client without modification. For example, image data files obtainable at a primary content provider's network address would likely remain untransformed, while metadata associated with the image file (e.g., HTML, XML, file name, etc. . . . ) could be transformed to reflect origination from intermediary provider 275A.

Policy 277A can also include rules generating transformed content 260 by transforming actual content data as published content 280 is obtained. One example use for altering actual content data includes the formation of one or more virtual web sites offering parental controls. As content is obtained, potentially offensive language, images, or sounds can be removed according to policy 277A before presentation to a young viewer. Another example use includes altering text or image content presented to a consumer based on demographic information known about such consumer. In the current art, advertisers must present a one-size-fits-all version of their content for all users, as web site hosting technologies do not facilitate the customization of content in real time for individual viewers. Using content modification rules based on known demographic or other information, intermediary providers enable advertisers or other distribution channel members to effectively customize published content to provide a tailored content experience to every requesting client.

Preferably policy 277A is applied as published content 280 is obtained, in near real-time (e.g., within 10 seconds). In yet more preferred embodiment, content is transformed at is it streamed through intermediately provider 275A. One skilled in the art will recognize that published content 280 can be buffered for inspection or modification. Although published content 280 can be buffered, a preferred provider 275A begins providing transformed content 260 to a client with a delay of less than 10 seconds from initial reception of published content 280. Yet more preferably, the delay is less than 1 second. Quickly responding to client's request aids in reducing loss of consumers that would otherwise be lost due to experiencing high latency.

It is contemplated that published content 280 could be cached. In particular, in a preferred embodiment it may be advantageous to cache large image or other multi-media files to facilitate faster response to client requests, or caching optimization to minimize client download time. In this manner, content delivery to a client is expedited resulting in reduced consumer loss due to latency or other content delays.

One can consider intermediary provider 275A as a disposable web site. Should a black listing event occur, the black listed intermediary provider can be discarded, replaced, or updated with a new network address. Furthermore, a plurality of intermediary 275A through 275B can be created as front ends of a primary content provider. VCHS 270 essentially offers the capability of making a single site appear as many sites. In some embodiments, 10 or more, or even 100 or more intermediary providers can be instantiated as front ends for a primary content provider.

Figure 3A:
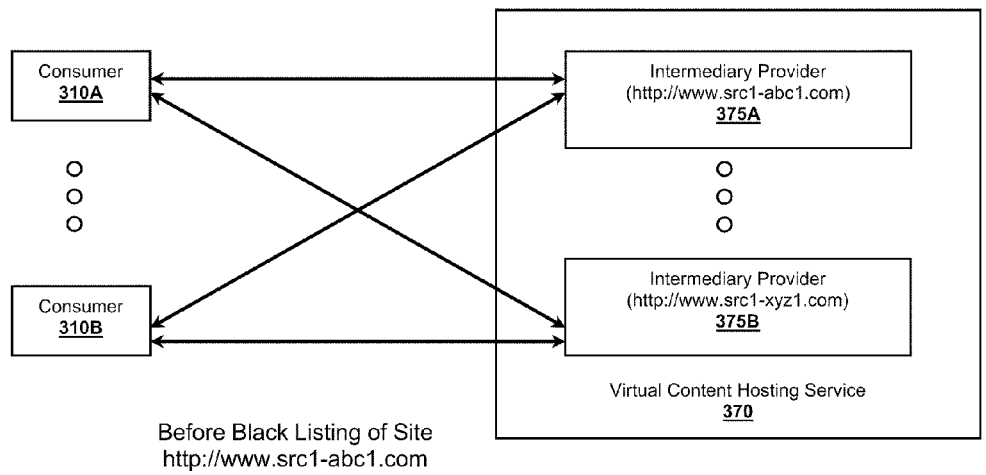
FIG. 3A is a schematic of an example system where published content is obtained from an intermediary content provider before the intermediary provider is black listed.

In FIG. 3A, before black listing, intermediary provider 375A provides published content at network address http://www.src1-abc1.com and intermediary provider 375B provides published content available at network address http://www.src1-xyz1.com to consumers 310A or 310B. Both intermediary providers could be associated with the same primary content provider, possibly located at http://www.src1.com. An ISP has decided to black list intermediary provider 375A. The ISP could make its decision based on spam complaints, or possibly by inspecting the site located at intermediary provider's network address.

Figure 3B:
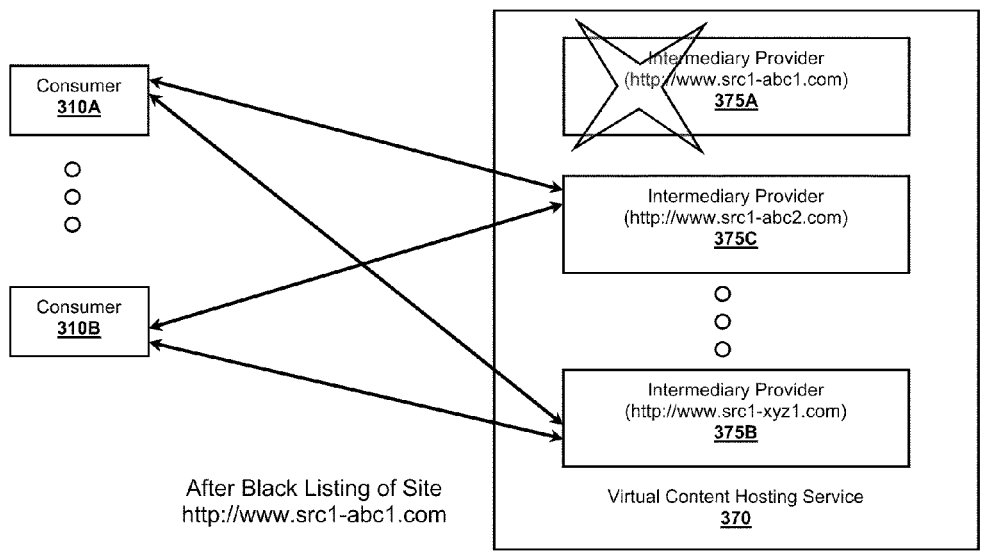
FIG. 3B is a schematic of the system of FIG. 3A after an intermediary content provider has been black listed and replaced by a new intermediary content provider.

FIG. 3B illustrates the value of having intermediary providers after intermediary provider 375A is black listed. After the detection of the black listing event, intermediary provider 375A can be removed from the VCHS. A new intermediary provider 375C can be instantiated with a new network address, preferrably a registered domain name. For example, the new address can be http://www.src1-abc2.com. Publishers can be updated with the new address to ensure that consumer 310A or 310B will direct their requests toward the new intermediary provider 375C.

Preferably, the time to instantiate a new intermediary provider is less than the time to update distribution channel members with new address information. In a preferred embodiment, the new intermediary provider is fully available in less than 24 hours and yet more preferably in less than one hour.

One aspect that could limit the speed at which an intermediary provider becomes fully available, is the amount of time necessary to update global DNS systems with the new address information. The risk of lost time can be mitigated by establishing a pool of parked registered domain names on VCHS 370. When desired, the VCHS 370 simply redirects all traffic directed toward the new address to intermediary provider 375C making intermediary provider 375C available nearly instantly.

Another advantage associated with providing intermediary providers includes collapsing client side redirects. In previous systems for distributing promotions, one or more members of the distribution channel modify URLs within the promotions. When a consumer clicks on a modified URL, rather than proceeding directly to the published content, they are redirected to one or more other sites beforehand. The redirection allows a distribution channel member to account for activity associated with their respective services. Such redirection can increase the latency with which a client obtains desirable published content.

A redirect can be triggered by a shortcut represented by a root base URL (e.g., /MyShortcut). A shortcut can be linked to one or more types of redirects by the intermediary provider rather than the client. Preferred types of redirects include a collapsed redirect, an asynchronous redirect, or a silent redirect.

Figure 4A:
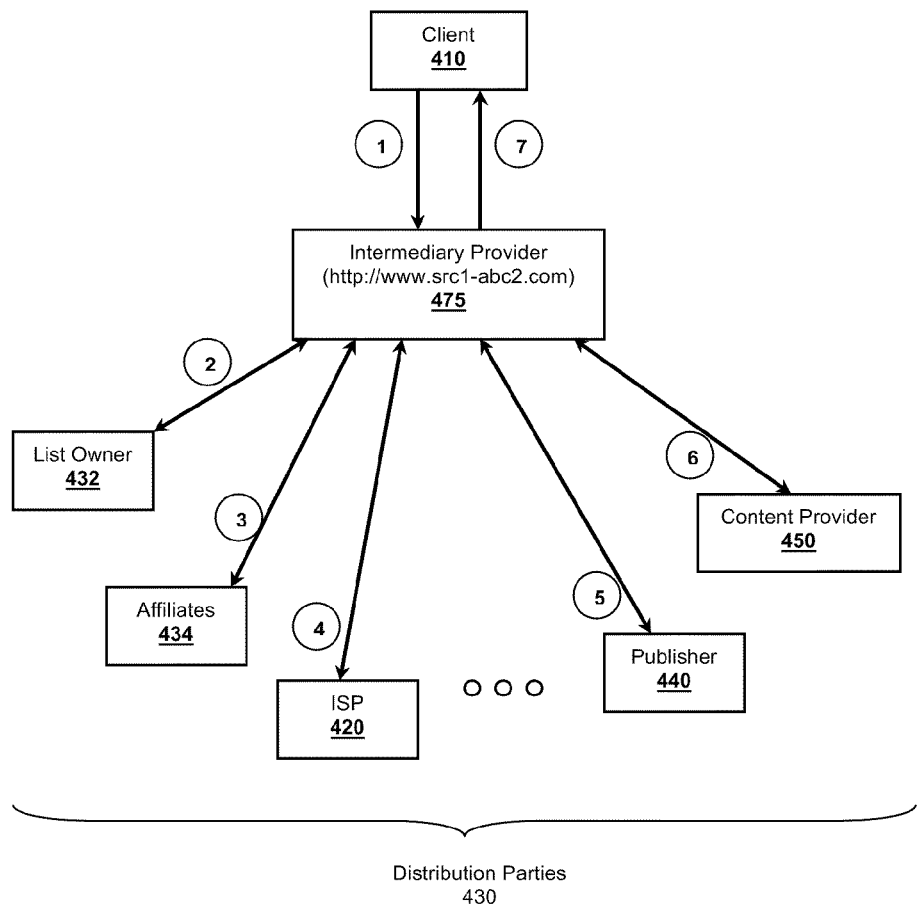
FIG. 4A is a schematic of a system where published content can be obtained without requiring redirection of a client by collapsing redirects.

In FIG. 4A, client 410 redirection can be avoided through the use of intermediary provider 475, by using a collapsed redirect. In support of a promotion, intermediary provider 475 can be programmed with appropriate redirects if desired.

Supporting back-end redirects allows various members 430 of the distribution channel to obtain accounting information.

Client 410 makes a request of intermediary provider 475 via communication 1. Intermediary provider 475 communicates with the various members 430 of the distribution channel (e.g., list owner 432, affiliates 434, ISP 420, publisher 440, etc. . . . ) or other interested parties, through communications 2 through 5. Although four redirects are shown, one should note that any number of back-end redirects can be supported. When appropriate, intermediary provider obtains published content from provider 450 via communication 6. The intermediary provider forwards transformed content on to client 410 at communication 7. In a preferred embodiment, intermediary provider 475 saves cookies or other information placed by the sites requesting redirection (e.g., list owner 432, affiliates 434, ISP 420, publisher 440, etc. . . . ) and replays them when the final landing page is reached on behalf of the respective domains.

One should also note that redirects can be performed substantially in parallel to reduce the delay experienced by a client. For example, upon receiving a request from client 410, intermediary provider 475 could obtain published content from provider 450 via communication 6 and deliver such communication 7 to the consumer 410 prior to completing communications 2 through 5.

Figure 4B:
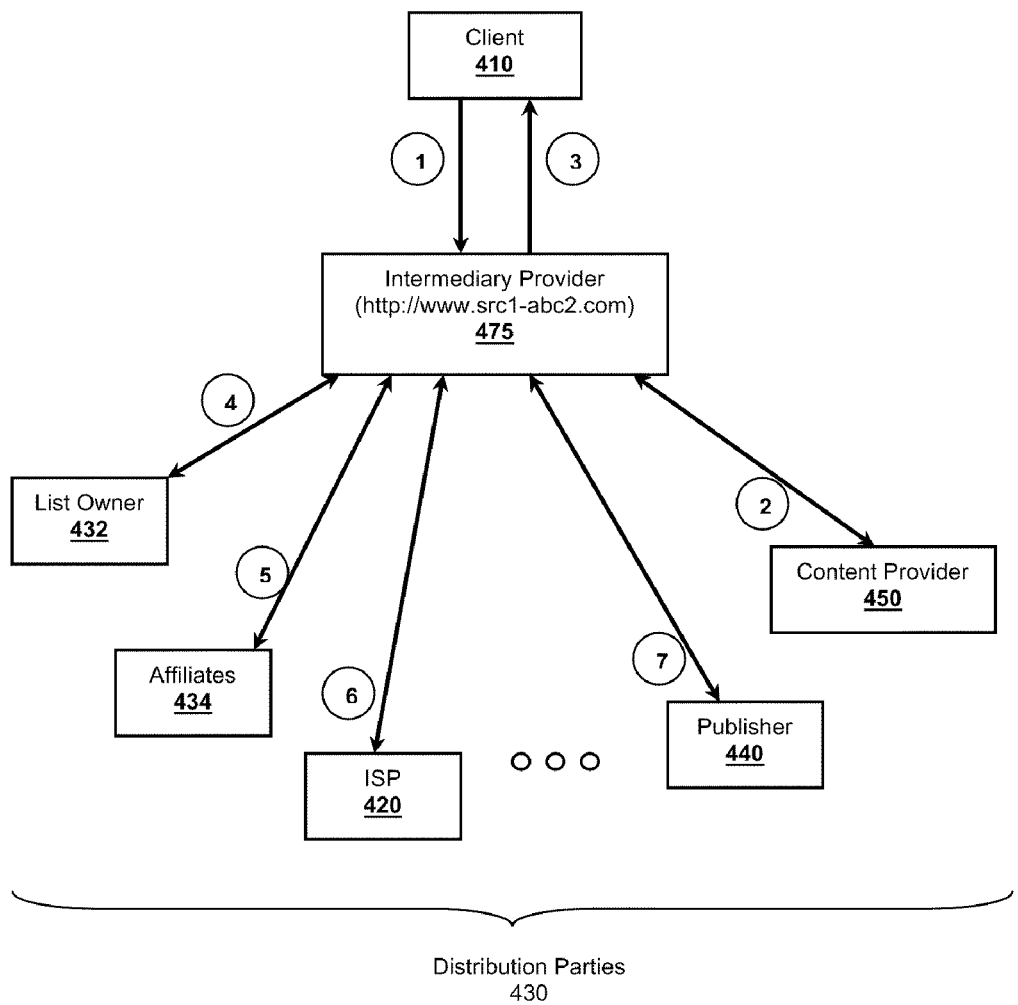
FIG. 4B is a schematic of a system where published content can be obtained without requiring redirection of a client through asynchronous redirects.

FIG. 4B presents an example of an asynchronous redirect where client 410 makes an initial request for content via communication 1 with intermediary provider 475. The content is obtained from primary provider 450 via communication 2 and the transformed content is delivered to the client as communication 3. Meanwhile, a background thread can be launched to follow desirable redirects as shown by communications 4 through 7.

Figure 4C:
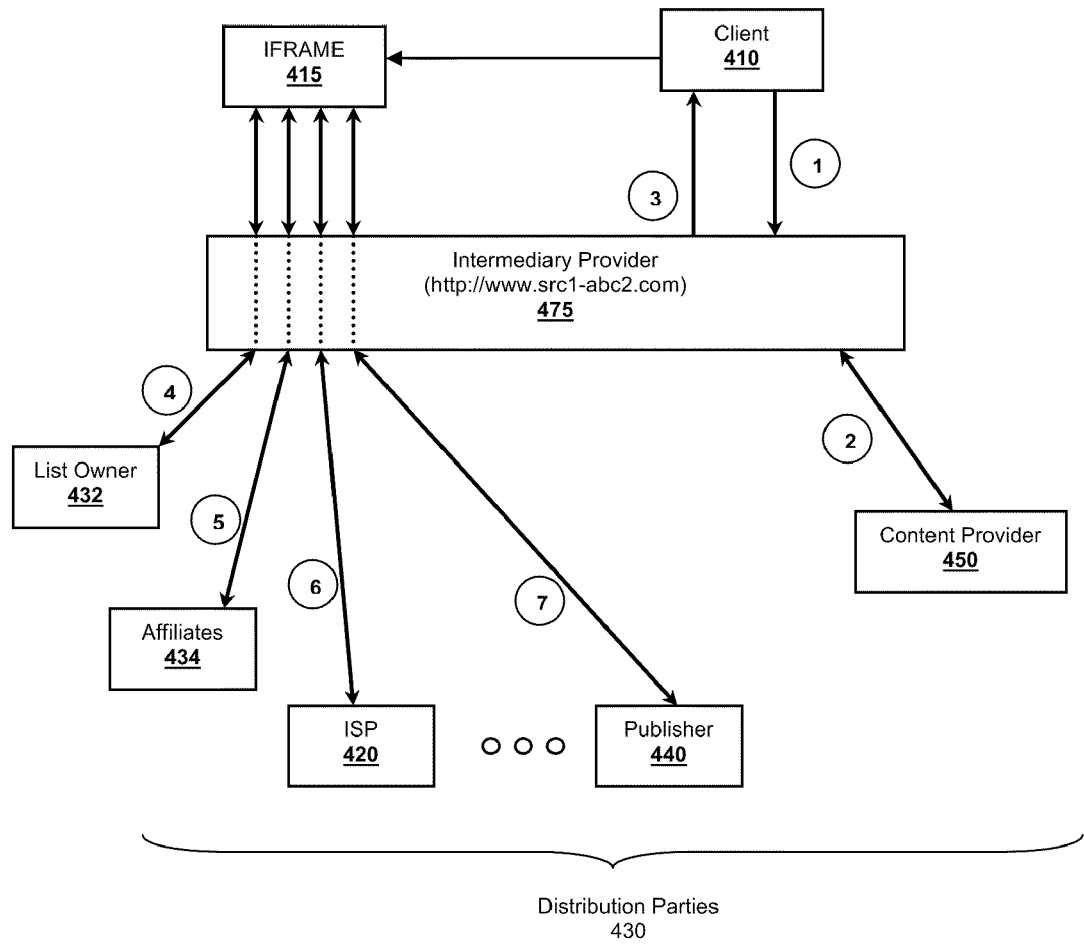
FIG. 4C is a schematic of a system where published content can be obtained through silent redirects using an invisible IFRAME.

In FIG. 4C, illustrates an example of a silent redirect (also referred to as an IFRAME-based redirect). Client 410 requests content through intermediary provider 475 via communication 1. Intermediary provider 475 obtains the content from provider 450 through communication 2 and presents client 410 with the requested landing page through communication 3. In addition, the landing page includes invisible IFRAME 415, which executes desirable redirects, for example communications 4 through 7. Intermediary provider 475 ensures that the final landing page is not displayed again via IFRAME 415 while only allowing IFRAME 415 to execute redirects. Silent redirects allow for various redirect hops (e.g., distribution members 430) to properly place cookies or other information in the browser of client 410.

It is also contemplated that back-end accounting can be performed after providing published content to client. In some embodiments, accounting information can be aggregated by VCHS 470 and periodically sent to distribution channel members or other interested parties. The accounting information could be processed on any suitable schedule including hourly, weekly, or monthly.

Figure 5:
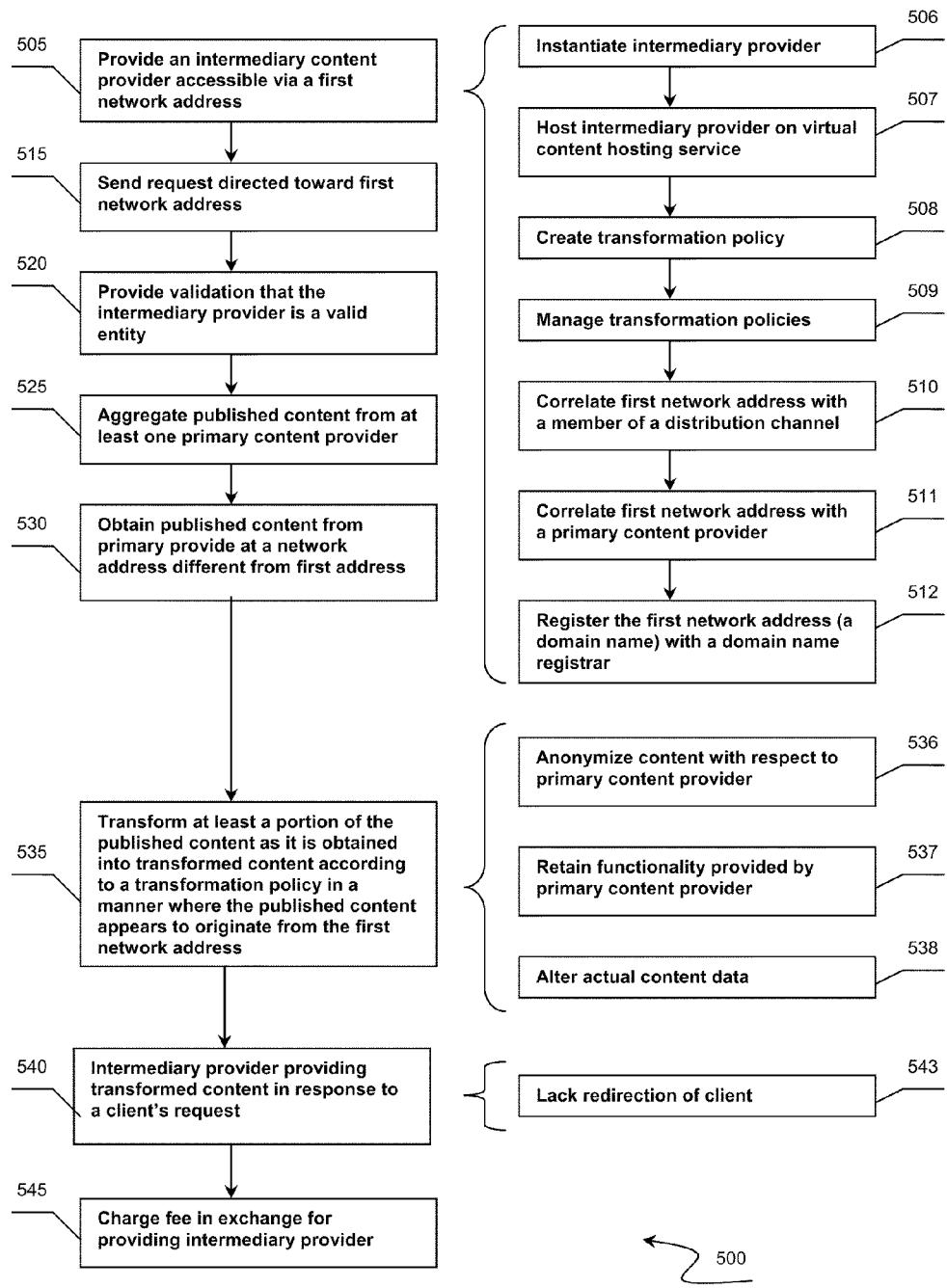
FIG. 5 is a schematic of a method for providing published content.

In FIG. 5, method 500 illustrates a possible method for providing published content to a client. Although the steps of the methods are presented in sequence, one skilled in the art will appreciate that the steps can performed in other sequences while still falling within the scope of the inventive subject matter.

At step 505 an intermediary content is made accessible via one or more network addresses. As previously discussed, a VCHS can support hosting one or more intermediate providers that are accessible by their individual network addresses. At step 506, an intermediary provider can be instantiated, preferably through management software programmed to configure and launch the intermediary provider. It is contemplated that the management software can execute local or remote to the VCHS system where management functionality can be accessed via a network accessible API, possibly using a web service. In a preferred embodiment the VCHS hosts the intermediary provider. It is also contemplated that other systems could host the intermediary provider, possibly the primary content provider for example.

Intermediary providers preferably include a transformation policy used to determine how to transform content. At step 508, the transformation policy is created to fit the needs of the primary content provider or other owner of the intermediary provider. The policy can be created through any suitable means including a software application. In some embodiments, the software application includes a web interface accessible by interested parties purchasing the services of the VCHS. For example, an advertiser can upload, select, or manage policies associated with their intermediaries in support of various advertising campaigns or promotions. Furthermore, as step 509 a plurality of policies are managed. Policy management can comprise various management functions including creating policies, deleting policies, modifying policies, scheduling policy actions, logging policy events, monitoring statistics or metrics, updating polices, reporting, notifying of events, or other management functions.

Intermediary providers can also act as a third party mediating content between the content provider and its clients or consumers. In this capacity, the intermediary provider can act as a certification service providing independent verification of the actions taken by the primary content provider or a client in any exchange. For example, if a consumer subscribes to a primary content provider's newsletter, the intermediary provider can independently record the content presented to such a consumer, the information submitted by such consumer, or any other information deemed relevant to consumer's subscription.

At step 510, it is contemplated that the network addresses of the intermediary provider are correlated with a member of a distribution channel. For example, if an advertiser providing content from http://www.src1.com wishes to publish a promotion through a publisher called "HonestPublishing", one could correlate the intermediary's network address by assigning the intermediary a domain name of "http://www.src1-honestpublishing.com". Any suitable method can be employed to correlate a network address with a distribution channel member including a look-up table. One skilled in the art will recognize that any network address could be used including domain names that are perceived to be random while still adhering to the rules for valid domain names (e.g., alpha-numeric characters, no preceding or trailing hyphens, and less than 64 characters including top level domain). Rather than using an advertiser's or publisher's name in a domain name, the intermediary could have a completely random domain name, "http://www.3xg87-w8khmc-23.com" for example.

Correlating an intermediary's network address with one or more members of a distribution channel provides numerous advantages. First, should the intermediary become black listed; an advertiser could deduce which members of the distribution channel might have been responsible. Second, an advertiser can determine which of the members of the distribution channel add the most value by correlating statistics with the addresses of the intermediaries. Third, based on compiled statistics or black listing events, feedback can be supplied to the members of the distribution channel so they can improve their practices.

Just as an intermediary's network address can be correlated with a member of the distribution channel, at step 511 the network address can correlate to a primary content provider. Such an approach may have several advantages, such as enabling intermediaries to carry the brand of the primary content provider. Alternatively, a primary content provider could desire to remain anonymous. In addition, an intermediary could correlate to multiple primary content providers based on one or more business rules established by the publisher or distribution channel members. Example business rules might include delivering content deemed the most relevant to the requesting consumer based on demographic criteria; or content which can be obtained from the primary content provider the fastest; or content from the provider which offers the publisher the most favorable financial terms at a particular point in time.

Although correlating network addresses with members of the distribution channel or primary provider is useful, it is also contemplated that other correlations have utility. For example, network addresses can be correlated to geographic region, affiliations (e.g., political, school, corporate, etc. . . . ), or other classifications.

At step 512, a network address preferably comprises a domain name where domain name is registered with the domain name registrar, Register.com for example. In some embodiments, one can create a pool of registered domain names having acceptable attributes before instantiating intermediary providers. The pre-registered domain names can parked at the VCHS system and, when needed, requests directed toward the domain name can be sent to a selected intermediary provider. For example, the VCHS might park thousands of domain names of the form src1-XXXXX.com where XXXXX represents a five digit number. Each of the domain names resolve to an IP address for the VCHS system. Should a request arrive directed to the parked domain name, the VCHS system can respond with a template web page, or not respond at all. When an intermediary becomes active, the VCHS system redirects the requests to an HTTP server associated with the target intermediary provider.

Once an intermediary provider has been instantiated or otherwise created, it is able to respond to requests from a client (e.g., a consumer). At step 515 a client directs a request to the network address of the intermediary provider. In some embodiments, a client utilizes a software application to send the request, possibly a web browser. In a preferred embodiment, requests for published content represent HTTP requests targeting a URL comprising the network address of the intermediary provider. Other types of requests are also contemplated including database queries, emails, instant messages, or other requests that can be transported over a network.

In some embodiments, at step 520 it is contemplated that a validation can also be sent to the client to indicate that the intermediary provider is, in fact, a trusted or otherwise valid entity. The validation can include digital certificates similar to those provided by VeriSign® (http://www.verisign.com/) or DigiCert® (http://www.digicert.com/).

At step 525, published connect is aggregated from at least one primary content provider. Published content is aggregated by pulling together the various data files, streams, feeds, functionality, or other published data. In a preferred embodiment the intermediary provider operates as an HTTP client requesting published content from a network address associated with the primary content providers. It is also contemplated that the content can be obtained from providers other than the primary content providers. For example, should a primary content provider post ads by Google, then those ads can be pulled from Google and presented to the consumer. Aggregation of the published content preferrably occurs in parallel by submitting multiple requests to content provider substantially at the same time.

At step 530, the published content is preferably obtained at a network address different from that used by an intermediary provider. In a preferred embodiment, the intermediary provider operates as an HTTP client requesting published content from a primary content provider. In some embodiments, the published content is obtained over a secure communication channel. A secure communication channel can be established between the intermediary and the client using HTTPS via SSL or other suitable protocols. In other embodiments, the published content is provided only after client or server authentication which provides additional confidentiality of data. Any acceptable authentication method can be employed including password exchange, OpenID (http://www.openid.net/), SecureID® offered from RSA® (http://www.rsa.com/), or other forms of authentication.

At step 535, at least a portion of the published content is transformed into transformed content as it is obtained according to a transformation policy in a manner where the published content appears to originate from the intermediary provider. It is also contemplated that transformed content could be transformed in a manner where it appears to originate from one or more network addresses assigned to the intermediary provider. When viewed externally by a client (e.g., a person, a computer, or software), the content appears to be published from the intermediary site. Preferably the published content is streamed through the transformation policy modules with any suitable buffering to ensure a client receives an initial portion of the transformed content within 10 seconds of the intermediary provider obtaining an initial portion of the published content.

At step 536, it is contemplated that a transformation policy can be configured to anonymize the published content with respect to the primary content provider. The published content can be fully or partially cleansed of undesirable references in either actual content data or in metadata. Providing an anonymizing service further protects primary content providers against the risk of black listing.

Additionally, at step 537, a preferred transformation policy ensures that an intermediary provider retains functionally of within the published content provided by the primary content provider. Functionality includes various capabilities offered by the primary content provider including links, APIs, applets, flash, embedded players, programmatic functions, or other capabilities beyond mere presentation of data.

At step 538, it is contemplated that an intermediary provider can alter actual content data. Altering the actual content data allows for anonymizing the primary providers as discussed previously. Additionally, altering content data also provides utility for purposes in addition to advertising. For example, the VCHS system and intermediary provider can also provide for censoring content for young viewers. A parent can purchase an intermediary provider that sanitizes web content for their children. Altering content can include adding, removing, or otherwise modifying the data by making changes to text, scripts, functions, audio, video, image, or other content data as it is obtained.

At step 540 the intermediary provider, preferably through an HTTP server, provides the transformed content back to the client. Although the preferred embodiment utilizes an HTTP server to respond to the client's request, the transformed content could be provided through alternative means. Contemplated alternatives include email, instant messaging, phone call, text messages, or other suitable means of communication.

Preferably the intermediary provider reduces a need for client side redirections. The intermediary provider, at step 543, can handle all accounting or other interactions through back-end redirects while lacking any redirection of the client. Contemplated redirects that lack client redirection include collapsed redirects or asynchronous redirects.

In a preferred embodiment the VCHS represents a paid service offering one or more intermediary providers to distribution channel members or advertisers in exchange for a fee. Contemplated fees include flat fees, per use fees, fees for bandwidth utilization, subscriptions, or other forms of charging a fee in exchange for providing an intermediary provider.

Figure 6:
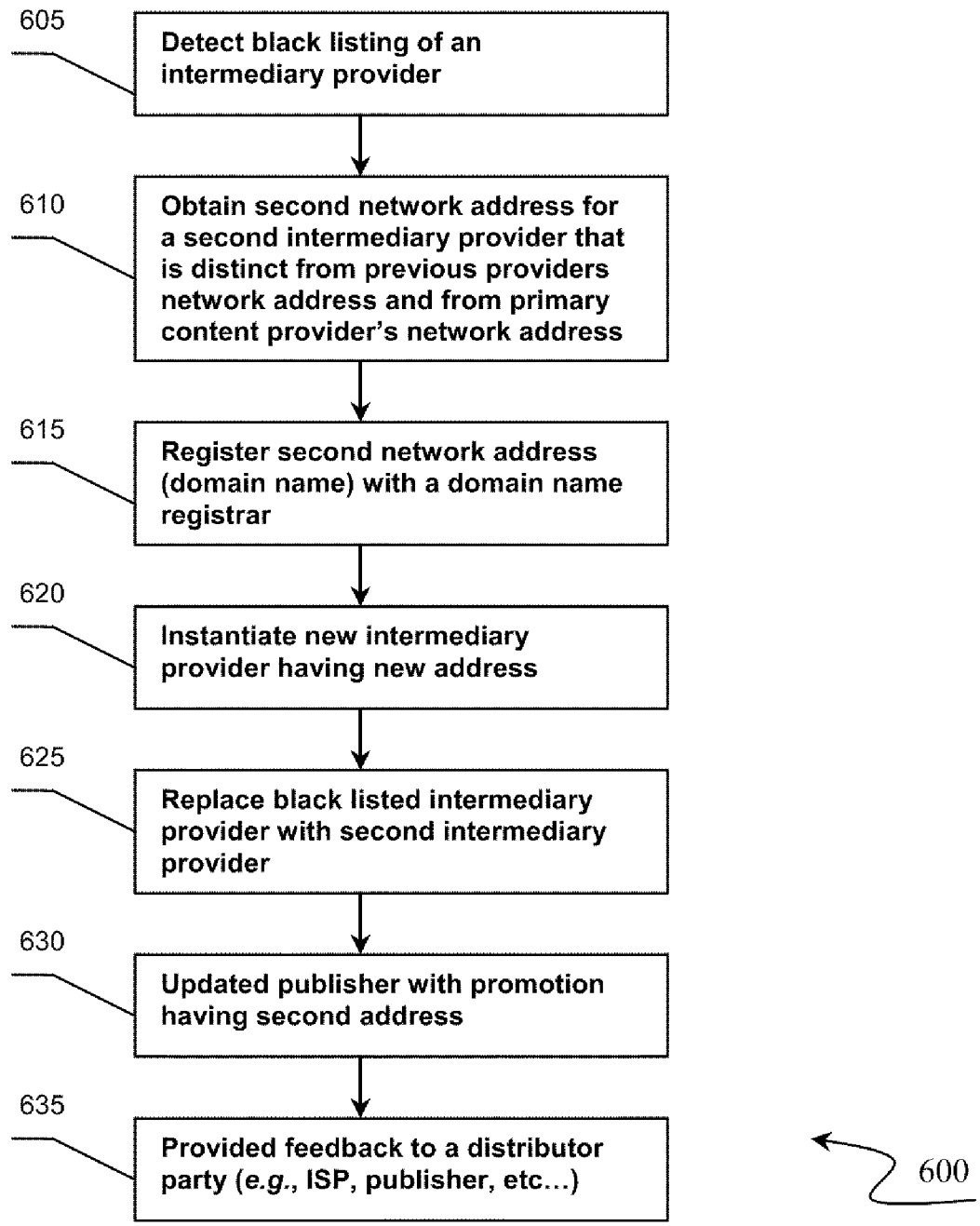
FIG. 6 is a schematic of a method of responding to a black listing event.

In FIG. 6, method 600 illustrates a possible set of steps for processing a black listing event affecting an intermediary provider. The intermediary provider can be replaced by a second intermediary provider having a second network address distinct from the old intermediary provider's network address. The following steps are provided in a sequence for clarity. One skilled in the art will recognize that strict adherence to the sequence of steps is not required.

At step 605, the reputation of a intermediary provider is monitored, including detection of a black listing event. Any suitable method of monitoring reputation or detecting the black listing event can be employed. One suitable method includes observing one or more metrics relating to the usage of the intermediary provider. When a usage metric crosses a threshold value, the intermediary provider can be considered black listed. Contemplated metrics include number of hits, rate at which hits occur, amount of data transferred, or other observable metric. Additionally, reputation can be monitored directly through third party services. A black listing event can be detected through third party notification, or through interaction with members of the distribution channel where the member, possibly an ISP, notifies a party associated with the intermediary provider of the black listing event. Preferably a VCHS system initially detects the black listing event and informs their customer of the event.

At step 610, a second network address different from the first intermediary provider's address is obtained. Preferred second addresses comprise URLs having different domain names. In some embodiments, as previously discussed, the second address can be drawn from a pool of existing registered domain names.

At step 615, if necessary, a domain name associated with the second network address is registered with a domain name registrar. One skilled in the art will recognize that this step can be performed while replacing the intermediary provider, or can be performed before the need arises by creating a pool of registered domain names.

At step 620, a second intermediary provider is instantiated as discussed previously with respect to method 500. At step 625, it is contemplated that the new intermediary provider replaces the black listed intermediary provider. Replacing the old intermediary provider can include associating a transformation policy with the new intermediary provider where the transformation policy could be a copy of the previous intermediary's policy. Furthermore, the new intermediary provider is configured to respond to incoming request by providing published content from the primary content provider. In a preferred embodiment, the step of replacing the intermediary provider occurs automatically via software possibly executing on a VCHS system. One should note that replacing a previous intermediary provide also includes simply updating the previous provider's network address with a new network address while retaining the previous intermediary provider with its transformation policy.

At step 630, as desired, one or more members of the distribution channel are updated with the new network address information. For example, an advertiser can send updated promotional materials having the new network addresses to a publisher. Alternately, publishers are notified directly of the network address change to the promotional materials already in their possession. The publishers can then send the modified promotional materials to consumers via their standard distribution methods.

At step 635, feedback can be sent to one or more members of distribution channel. Feedback can include information relating to a black listing event, or other acceptable information. Supplying feedback establishes a foundation of an auditing system useful to all members of the system. An ISP will find the feedback valuable to ensure they properly allow desirable content to reach their users. Members of the distribution channel will find feedback valuable to improve their practices. Primary content providers, including advertisers, will find the feedback useful to determine how to optimize their distribution channels and hold problematic distribution channel members accountable for their business practices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A method of publishing content, the method comprising:
   providing an intermediary content provider accessible via a first network address;
   obtaining, by the intermediary content provider, published content from at least one primary content provider, where the published content from each primary content provider is obtained at a network address that is different from the first network address;
   transforming, by the intermediary content provider, at least a portion of the published content into transformed content according to a transformation policy; and
   in response to a client's request directed toward the first network address, the intermediary content provider providing the transformed content to the client.

2. The method of claim 1, further comprising instantiating the intermediary provider.

3. The method of claim 1, wherein the first network address comprises a domain name.

4. The method of claim 1, further comprising utilizing a transformation policy based in part on the identity of the client.

5. The method of claim 1, further comprising correlating the first network address with a member of a distribution channel.

6. The method of claim 1, further comprising correlating the first network address with the at least one primary content provider.

7. The method of claim 1, further comprising replacing the intermediary provider with a second intermediary provider having a second network address distinct from the first network address and from each primary content provider's network address.

8. The method of claim 6, wherein the step of replacing the intermediary provider occurs automatically.

9. The method of claim 1, further comprising providing a plurality of intermediary providers.

10. The method of claim 9, further comprising managing a plurality of transformation policies associated with the plurality of intermediary providers.

11. The method of claim 9, wherein the plurality of intermediary providers comprises at least 10 providers each with their own distinct network address.

12. The method of claim 11, wherein the plurality of intermediary providers comprises at least 100 providers each with their own distinct network address.

13. The method of claim 1, further comprising charging a fee in exchange for providing the intermediary content provider.

14. The method of claim 1, wherein the step of providing the transformed content to the client includes retaining functionality published by the at least one primary content provider.

15. The method of claim 1, wherein the published content includes at least one of the following types of data: image data, video data, audio data, text data, streamed data, feed data, and file data.

16. The method of claim 1, further comprising anonymizing the content with respect to the at least one primary content provider.

17. The method of claim 1, wherein the step of providing the transformed content to the client lacks redirection of the client.

18. The method of claim 1, further comprising providing the client a validation that the intermediary provider is a valid entity.

19. The method of claim 1, further comprising hosting the intermediary provider on a virtual content hosting service.

20. The method of claim 1, wherein the step of transforming the content further comprises altering actual content data.

* * * * *